April 8, 1958     B. I. ULINSKI     2,829,903
STEERING SYSTEM FOR INDUSTRIAL TRUCK
Filed Feb. 17, 1954     4 Sheets-Sheet 1

INVENTOR
B. I. Ulinski
BY
[signature]
ATTORNEY

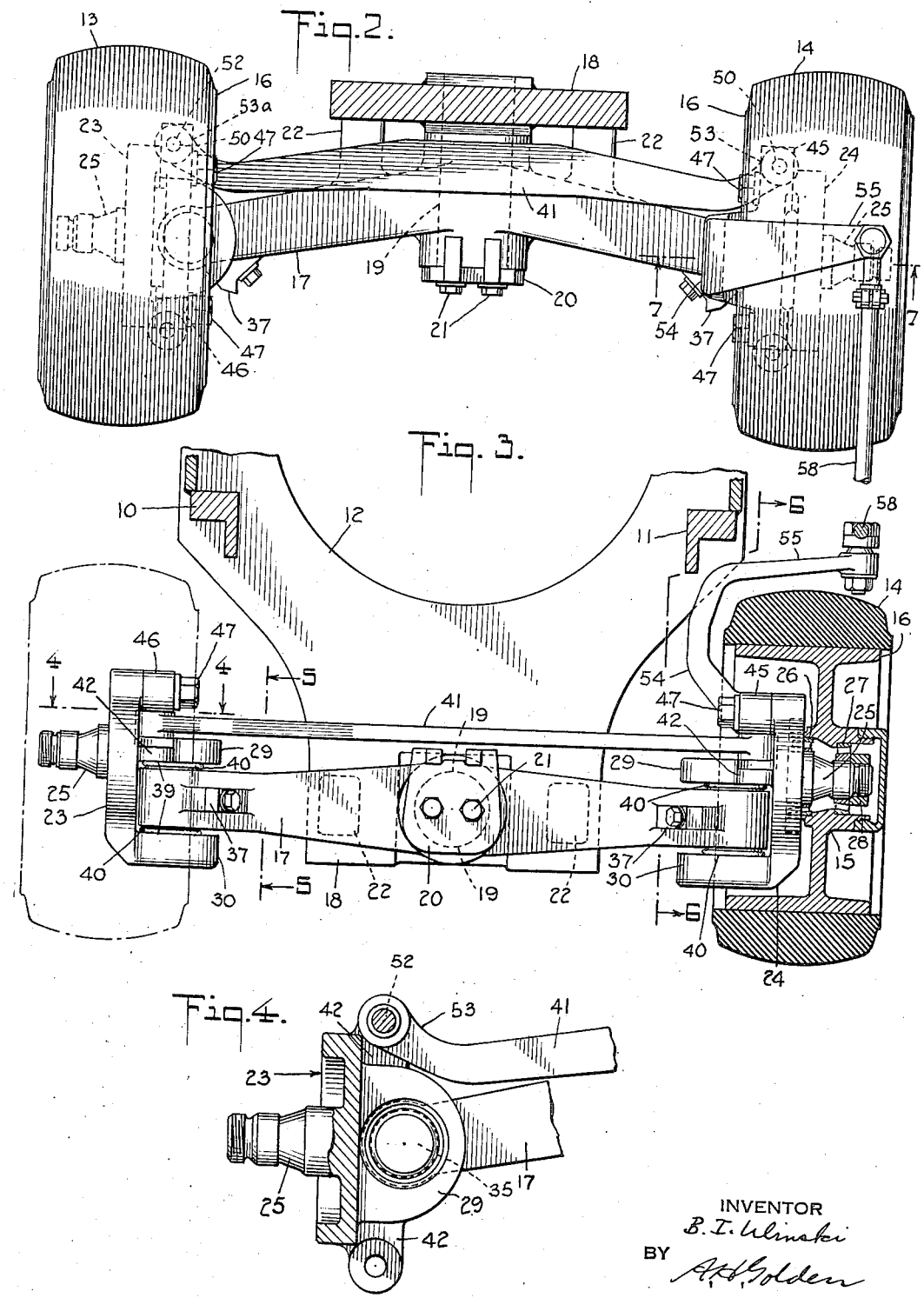

April 8, 1958

B. I. ULINSKI 2,829,903

STEERING SYSTEM FOR INDUSTRIAL TRUCK

Filed Feb. 17, 1954

INVENTOR
B. I. Ulinski
BY
ATTORNEY

April 8, 1958   B. I. ULINSKI   2,829,903
STEERING SYSTEM FOR INDUSTRIAL TRUCK
Filed Feb. 17, 1954   4 Sheets-Sheet 4
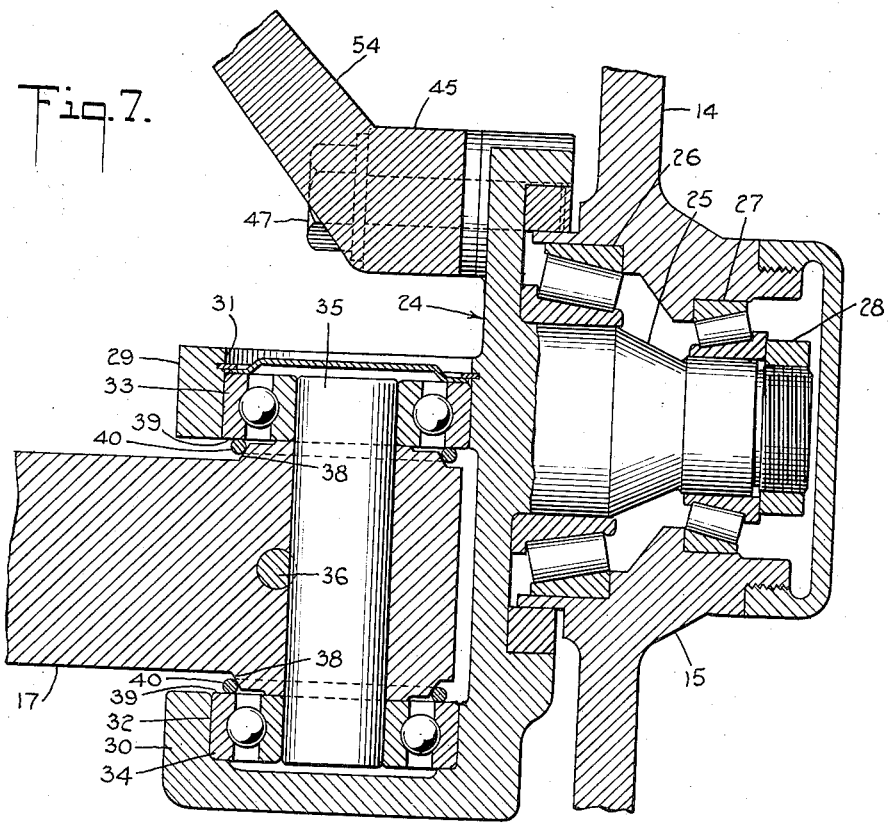
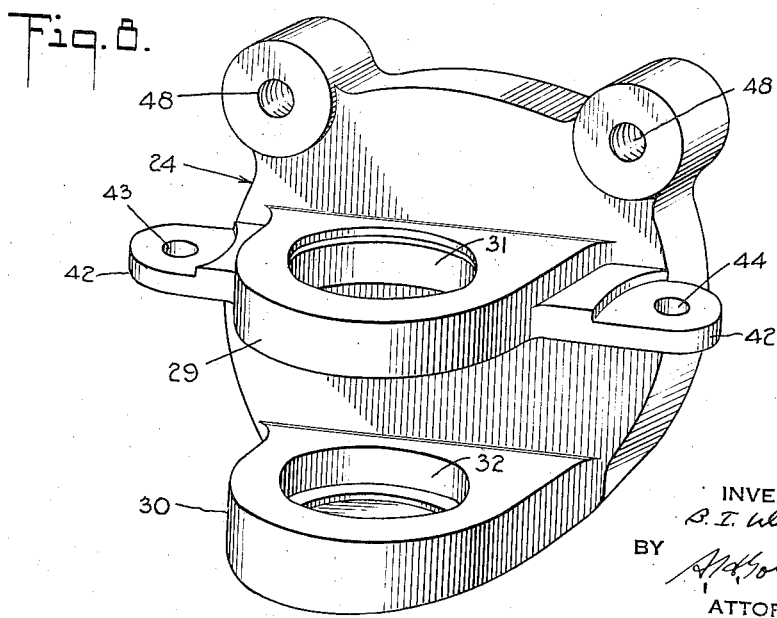
INVENTOR
B. I. Ulinski
BY
A. H. Golden
ATTORNEY

United States Patent Office 2,829,903
Patented Apr. 8, 1958

2,829,903
STEERING SYSTEM FOR INDUSTRIAL TRUCK

Bronislaus I. Ulinski, Chicago, Ill., assignor to The Yale & Towne Manufacturing Company, Stamford, Conn., a corporation of Connecticut Application February 17, 1954, Serial No. 410,810

14 Claims. (Cl. 280—95)

This invention relates to wheel mounting and steering means for industrial trucks.

In trucks of this class, it is important that the steering wheels be capable of steering movement through a wide angle, and that the wheels be steered easily and without reacting excessively through the steering mechanism due to forces caused by the movement of the truck. Also, the steering wheels should have some relative movement in a vertical direction in order to compensate for irregularities in the surface of the ground. It is, further, of extreme importance that the wheel mounting and steering means be accessible for servicing and yet occupy only a very small space, in view of the rather severe space limitation that is inherent in trucks of the particular class. I meet all of these requirements through the extremely novel wheel mounting and steering means that I contribute by my invention. I accomplish this, moreover, through a construction that is simple and relatively inexpensive to manufacture, yet very sturdy and well suited to the type of service to which trucks of the particular class are subjected.

As one feature of my invention, I pivot the wheels for steering movement on the opposed ends of an axle, with the steering axis for each wheel positioned actually within the wheel. Further, I utilize a tie rod for holding the wheels in steering alignment, with this tie rod so arranged as to occupy very little space on the truck, while enabling the wheels to be steered at a very sharp angle without the use of intermediate steering arms upon the axle. More particularly, I connect each end of the tie rod to a wheel through a pivot positioned within the wheel, and preferably farther within the wheel than is the steering axis of the wheel. These tie rod pivots are above the ends of the axle, and the tie rod is so formed as to move over the axle on these pivots as the wheels are steered.

As another feature, I mount the axle for rocking movement in an axis positioned intermediate the wheels, and preferably positioned also below the wheel axis. To accomplish this, I utilize a frame member on the truck. A lower portion of this frame member carries a pivot in the longitudinal axis of the truck, and the axle is mounted on this pivot in juxtaposed relation to the frame member. As a further part of this feature of the invention, I provide, between the axle and the frame member, surfaces through which the member accepts forces tending to bend the pivot when the wheels encounter an obstruction.

As a particular feature of my invention, I utilize for mounting each wheel an extremely novel mounting and steering member that is reversible, thereby enabling me to utilize the member at either side of the truck. To accomplish this, I equip the member with means for pivoting it to an end of the axle in an axis that is symmetrical relatively to the member. Preferably, these means include a pair of spaced flanges that are adapted to pivot on a king pin relatively to an end of the axle. At equal distances on opposed sides of the king pin axis, I form the wheel mounting member with bearings for the tie rod pivot. I further form the member, in symmetrical relation to the king pin axis, with means for mounting a bearing member to hold the tie rod pivot relatively to either tie rod pivot bearing. Thus, I can pivot the tie rod to the wheel mounting member at the proper side of the steering axis, without regard to the particular end of the axle to which the wheel mounting member is pivoted. As a further part of this feature, I utilize one of the bearing members for the tie rod pivot as a part of the steering apparatus. For this purpose, I form one of the bearing members with an integral steering arm. Because this bearing member is mounted through symmetrical means, it is possible to adapt the truck very easily to be steered through either wheel mounting member.

As a more detailed feature of my novel wheel mounting and steering member, I so arrange the bearings for the tie rod pivot that the tie rod can move over the king pin and its bearing means. Further, I mount the bearing member for the tie rod pivot in spaced relation above the king pin bearing so that the tie rod can move between the bearing member and the king pin bearing. Through this construction, I am able to steer the wheel mounting member at a very sharp angle relatively to the axle.

I have thus outlined rather broadly the more important features of my invention in order that the detailed description thereof that follows may be better understood, and in order that my contribution to the art may be better appreciated. There are, of course, additional features of my invention that will be described hereinafter and which will form the subject of the claims appended hereto. Those skilled in the art will appreciate that the conception on which my disclosure is based may readily be utilized as a basis for the designing of other structures for carrying out the several purposes of my invention. It is important, therefore, that the claims be regarded as including such equivalent constructions as do not depart from the spirit and scope of my invention, in order to prevent the appropriation of my invention by those skilled in the art.

Referring now to the drawings,

Fig. 2 is a plan view of my novel wheel mounting and steering means.

Fig. 3 is a vertical elevation of the structure of Fig. 2.

Fig. 4 is a section on line 4—4 of Fig. 3.

Figure 5:
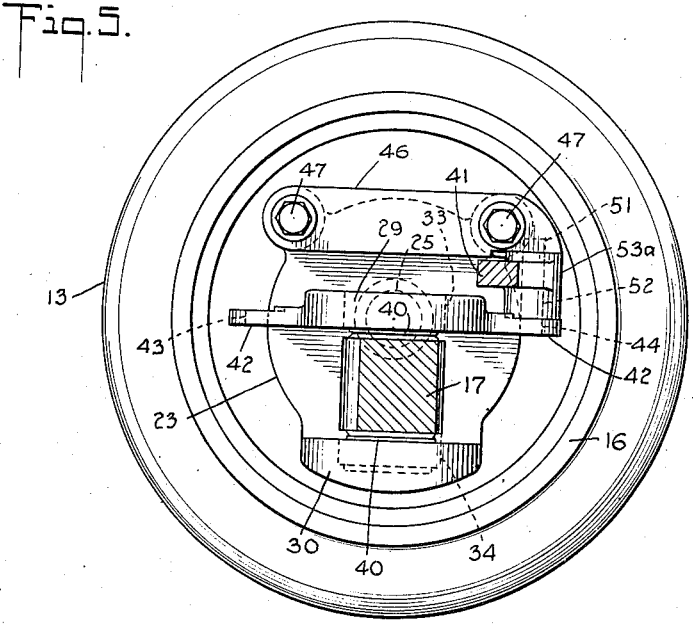
Figure 6:
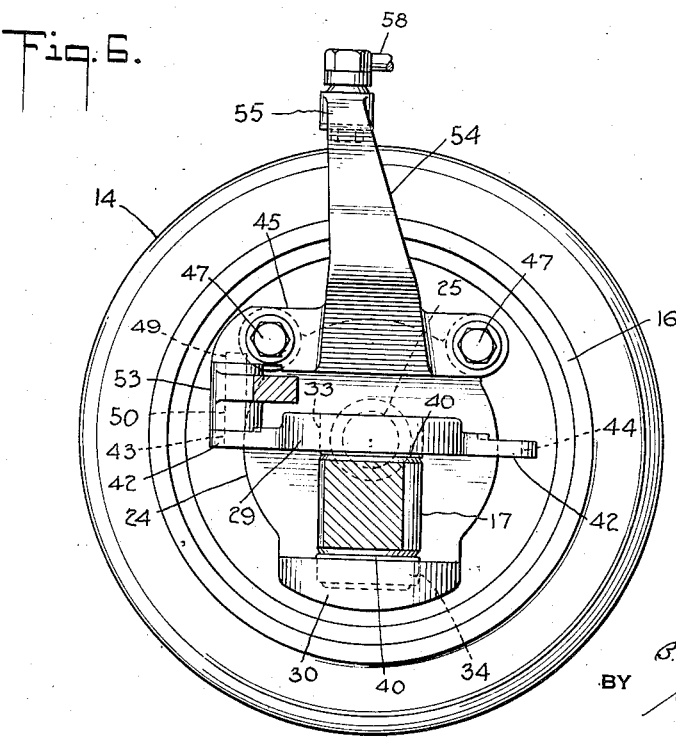

Figs. 5 and 6 are cross sections on lines 5—5 and 6—6 of Fig. 3.

Fig. 7 is a vertical section on the line 7—7 of Fig. 2.

Fig. 8 is a perspective view of a wheel mountnig member.

Figure 1:
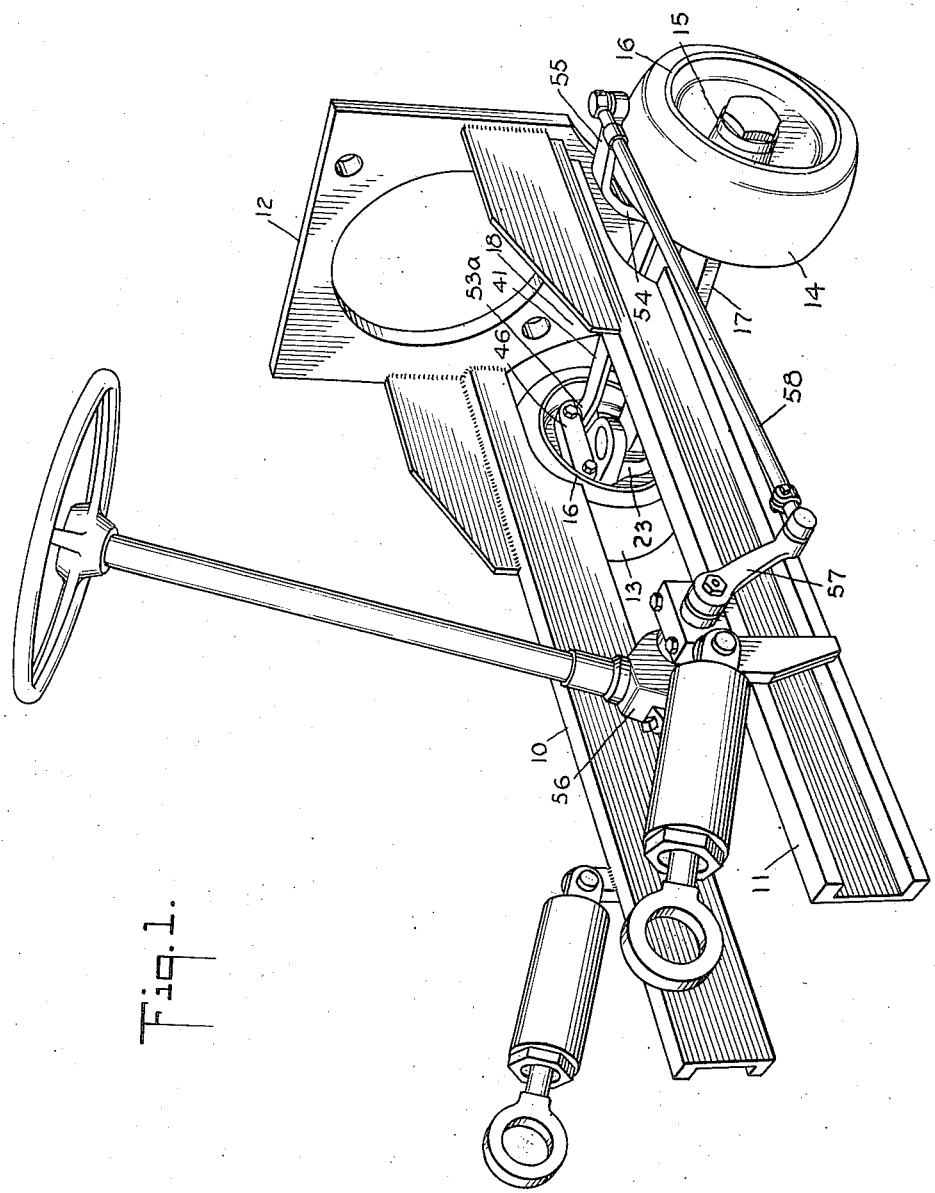
Fig. 1 is a perspective view showing my invention embodied in a truck.

Referring now more particularly to Fig. 1, I show a truck frame having longitudinal side members 10 and 11, and a transverse plate-like frame member 12 which in this instance is the rear end member of the truck. I show at 13 and 14 a pair of steering wheels mounted through my novel construction in positions relatively close to the outer sides of the opposed frame side members 10 and 11, as indicated clearly in Figs. 1 and 3. The wheels 13, 14 have hubs 15 at their outer sides, and are equipped with rims 16 extending a considerable distance at the inner sides of the wheels whereby to define a relatively large open space at the inner side of each wheel.

In my invention, I utilize for mounting the wheels, 13, 14, an axle 17 that is positioned quite closely to the ground and a considerable distance below the side members 10, 11 of the frame, as best seen in Fig. 3. For mounting the axle 17, I form the transverse plate-like frame member 12 with a lower central depending portion 18 to which is welded a pivot 19 in the longitudinal axis of the truck, as shown in Figs. 2 and 3. The axle 17 is formed with a bearing whereby to rock upon the pivot 19 when the wheels 13, 14, move over irregular ground. I retain the axle 17 upon the pivot 19 preferably through an end plate 20 secured to the pivot by screws 21. In this arrangement, the axle 17 is juxtaposed to one face of the lower frame portion 18, enabling me to utilize very efficiently the available space upon the truck, as will be further described in detail in due course. It will be observed at this point, however, that the axle 17 is equipped with bearing surfaces in contact with the frame member 12 at points spaced from the pivot 19, as best seen in Fig. 2, these surfaces being formed preferably upon lugs 22 integral with the axle 17. Through the lugs 22, the transverse frame member 12 accepts from the axle 17 forces that occur when the wheels 13, 14 encounter an obstruction, thereby reducing the bending stresses to which the pivot 19 is subjected.

I mount the wheels 13, 14 upon the axle 17 through a pair of extremely novel mounting members 23, 24. I prefer to form these members 23, 24 as exact duplicates, and it will suffice, therefore, to describe merely the details of the member 24. I form integrally upon one side of the member 24 a stub shaft 25, Figs. 3 and 7, adapted to carry roller bearings 26, 27 on which the wheel 14 rotates. The outer end of the stub shaft 25 is threaded whereby to receive a retaining nut 28, Fig. 7. Upon the opposed side of the mounting member 24, I form upper and lower flanges 29, 30, that are adapted to receive between them an end of the axle 17 in a position below the axis of the wheel 14 as determined by stub shaft 25. The upper and lower flanges 29, 30, are formed with vertically aligned openings 31, 32, in which I mount upper and lower ball bearings 33, 34. The end of the axle 17 has a king pin 35 fixed relatively thereto by a key 36, Fig. 7, and the ends of the king pin are positioned in the bearings 33, 34, whereby the wheel mounting member 24 is adapted for steering movement in the axis of the king pin 35. Preferably, the axle 17 is formed near its ends with lugs 37, Fig. 2, that act as stops to limit the rotation of the wheel mounting members 23, 24 on their king pins. It is exceedingly important to observe that the upper and lower flanges 29, 30 on the wheel mounting member 24 are so formed as to position the king pin axis actually within the wheel 14, as will be clearly apparent from Figs. 2 and 3. This arrangement, together with further features that I shall describe, enables me to steer the wheels 13, 14 very easily.

It is, of course, important to exclude dirt and water from the king pin bearings 33 and 34, and I contribute by my invention extremely novel means for this purpose. Referring particularly to Fig. 7, I form on the upper and lower sides of the axle 17 tapered surfaces 38 in opposed relation to seating surfaces 39 on the bearings 33 and 34. In encircling relation to the tapered surfaces 38, and confined between these surfaces and the surfaces 39, are O-rings 40 of resilient and flexing material. These O-rings 40 have a normal diameter that is somewhat smaller than the tapered surfaces 38, whereby surfaces 38 cam and press the O-rings 40 firmly toward and against the seating surfaces 39. Through this particular construction, I am able to seal the king pin bearings effectively, even though these bearings are exposed to a considerable amount of dirt because of their extremely low position upon the truck.

As has already been indicated, each of the duplicate wheel mounting members 23, 24, is adapted for mounting at either end of the axle 17, and each of the wheel mounting members 23, 24 is capable of supporting one of the steering wheels. I shall now described how the duplicate wheel mounting members 23, 24 are connected by a tie rod 41 that is secured in different relation to each of the duplicate wheel mounting members 23, 24. Further, I will indicate how one of the means for securing the tie rod 41 to one of the wheel mounting members functions also as a steering member.

For the particular purpose just indicated broadly, each wheel mounting member 23, 24 has, at opposed sides of the steering axis, flanges 42 that are extensions of the upper flange 29, one flange being formed with a bore 43 and the other with a similar bore 44, best shown in Fig. 8. Either of the bores 43, 44 may be utilized as a bearing for a pivot pin for one end 53 or 53a of the tie rod 41, as will be appreciated. It may be noted at this point, referring to Figs. 2, 3, and 4, that a pivot pin in the bore 43 or 44 will be positioned outwardly from the king pin relatively to the length of the axle, or in other words farther inwardly of the wheel than is the steering axis of the wheel. For cooperation with the bores 43, 44, I may utilize a combined steering and bearing member 45 best shown in Figs. 3 and 6, or a simple bearing bar 46 best shown in Fig. 5. Thus, to secure the right hand end 53 of the tie rod 41 to the wheel mounting member 24 in the relationship illustrated in Figs. 2, 3 and 6, I utilize the combined steering and bearing member 45. A part of the member 45 extends horizontally across an upper portion of the wheel mounting member 24 and is attached to the mounting member 24 by a pair of bolts 47 threaded into threaded bores 48, Fig. 8, that are symmetrically located at opposed sides of the king pin axis. Bearing member 45 has a bore 49 in alignment with the bore 43 so that a bearing pin 50 for the tie rod 41 may extend between the bore 43 and bearing bore 49 in the arm 45, as well illustrated in Fig. 6.

I equip the left hand wheel mounting member 23 also with symmetrically located bolts 47, Figs. 3 and 5, but in this instance I utilize the bolts 47 to secure the bearing bar 46. This bearing bar 46 extends horizontally across an upper portion of its wheel mounting member, being in this respect like a part of the steering and bearing member 45, but the bar 46 is formed with a bore 51 in alignment with the bore 44 in the mounting member 23. Thereby the bearing bar 46 coacts with the bore 44 to mount a pivot pin 52 for the left hand end 53a of the tie rod 41. The wheel mounting members 23 and 24 that I have described are completely interchangeable. This feature, together with the simple construction of my axle, is of considerable value because it enables me to provide a wheel mounting and steering construction that is easily assembled and serviced.

I have already described the positions of the tie rod pivots 50, 52 outwardly from the king pins relatively to the length of the axle 17. It should be emphasized that the tie rod pivots 50 and 52 so position the tie rod 41 that the tie rod can move freely above the upper flange 29 of each wheel mounting member. Also, the steering and bearing member 45 and the bearing member 46 for the tie rod pivots are mounted in spaced relation above the flanges 29, as clearly shown in Figs. 5, 6, and 7. Moreover, the end portions 53, 53a of the tie rod 41 are offset relatively to the body portion of the tie rod, as best seen in Fig. 2, thereby enabling the tie rod 41 to have clearance relatively to the rims 16 of the wheels 13, 14 when the wheels are steered. Each end portion 53, 53a, can move also over the king pin bearings and into the space between the flange 29 and the combined steering and bearing member 45 or member 46 on its wheel mounting member. I am able, therefore, to steer the wheels 13, 14, through an extremely wide angle, and furthermore, to steer the wheels easily and with relatively small force reaction through the steering mechanism. All of these things I accomplish without the use of intermediate steering arms on the axle.

It is important to note also that the tie rod 41 in my novel construction is rather close to the axle 17, and is juxtaposed also to the lower portion 18 of the frame member 12. This arrangement, together with the relatively low position of the axle 17 and tie rod 41, enables me to provide a steering construction that occupies very little space in the truck.

I shall now describe particularly those parts that I utilize in my invention to impart steering movement to the combined steering and bearing member 45. Steering and bearing member 45 has extending therefrom an arm 54 best seen in Fig. 3. This steering arm 54 extends away from the bearing member 45 in order to have clearance relatively to the rim 16 of the wheel 14, and then upwardly and outwardly intermediate the wheel 14 and the frame side member 11. It should be observed here that the upwardly extending portion of the steering arm 54 requires very little space for its movement because it is positioned almost in the steering axis for the particular wheel. An outer end portion 55 on the steering arm 54 is positioned actually over the wheel 14. For moving the steering arm 54, I equip the truck with steering mechanism 56, Fig. 1. This steering mechanism 56 may be of a conventional type, and I believe it unnecessary to describe this mechanism in detail. It is necessary, however, to note that this steering mechanism has an arm 57 pivoted to move relatively to the frame in a forward and rearward direction outside the frame member 11. The arm 57 is connected to the outer end 55 of the steering arm 54 through a steering link 58 positioned outside the truck frame. I thereby enable the steering mechanism 56 to steer the wheels through means that require no space within the truck frame, and that do not in fact extend inwardly above or below the frame.

I believe that those skilled in the art will now understand the operation and advantages of my novel wheel mounting and steering construction. Through this construction, I can steer the wheels of an industrial truck through an exceedingly wide angle with a minimum of force necessary to effect the steering movement. I accomplish this without the utilization of intermediate steering arms or links. Furthermore, the entire axle and steering assembly is extremely simple and compact, and requires very little space upon the truck, but does enable the wheels to move vertically when moving over uneven ground. I believe, therefore, that the very considerable value of my invention will be fully appreciated.

I now claim:

1. In a truck of the class described, a reversible wheel mounting and steering member having integrally formed on one side thereof a pair of spaced flanges, said pair of flanges having vertically aligned openings for bearings defining a steering axis in which the wheel mounting member may be mounted to rotate on a king pin, a bearing on said wheel mounting and steering member at each side of the steering axis adapted for pivoting one end of a tie rod, and means for mounting on said reversible wheel mounting member either of two bearing members to coact with said tie rod bearings to secure the tie rod relatively to the wheel mounting member.

2. In a truck of the class described, a reversible wheel mounting and steering member having integrally formed upon one side thereof a pair of spaced flanges, said pair of flanges having vertically aligned openings for bearings defining a steering axis in which the wheel mounting member may be mounted to rotate on a king pin, a bearing on said wheel mounting and steering member at each side of the steering axis adapted for pivoting one end of a tie rod, a pair of securing means on said wheel mounting and steering member, a part secured to said wheel mounting and steering member through said pair of securing means, and said part coacting with one of said tie rod pivot bearings to secure the tie rod relatively to the wheel mounting member.

3. In a truck of the class described, a reversible wheel mounting and steering member having integrally formed upon one side thereof a pair of spaced flanges, said pair of flanges having aligned openings for bearings defining a steering axis in which the wheel mounting member may be mounted to rotate on a king pin, a bearing on said wheel mounting and steering member at each side of the steering axis adapted for one end of a tie rod pivot, a bearing member, bearing means on said bearing member for the other end of the tie rod pivot, and means mounting said bearing member on said reversible wheel mounting member.

4. In a truck of the class described, a reversible wheel mounting and steering member having upon one side thereof bearing means defining a steering axis in which the wheel mounting member may be mounted to rotate on a king pin, a bearing on said wheel mounting and steering member at each side of the steering axis adapted for pivoting one end of a tie rod, and means for mounting on said reversible wheel mounting member either of two bearing members to coact with said tie rod bearings to secure said tie rod relatively to the wheel mounting member.

5. In a truck of the class described, a wheel mounting and steering member having upon one side thereof bearing means defining a steering axis in which the wheel mounting and steering member may be mounted to rotate on a king pin, a bearing on said wheel mounting and steering member at each side of the steering axis adapted for one end of a tie rod, a pair of securing means on said wheel mounting and steering member at opposed sides of the steering axis, a part secured to the wheel mounting and steering member through said securing means, an integral steering arm on said part extending vertically therefrom, and said part coacting with one of said tie rod bearings to secure said tie rod relatively to the wheel mounting member.

6. In a truck of the class described, a reversible wheel mounting and steering member having upon one side thereof bearing means defining a steering axis in which the wheel mounting member may be mounted to rotate on a king pin relatively to the axle, a bearing on said wheel mounting and steering member at each side of the steering axis adapted for pivoting one end of a tie rod in an axis positioned outwardly beyond the steering axis relatively to the length of the axle, and means for mounting on said reversible wheel mounting member either of two bearing members to coact with said tie rod bearings to secure the tie rod relatively to the wheel mounting member.

7. In a truck of the class described, a reversible wheel mounting and steering member having a stub shaft upon one side thereof, a wheel mounted to rotate on said stub shaft, bearing means on the opposed side of said wheel mounting and steering member, said bearing means defining a vertical steering axis positioned within the wheel, a pair of bearings on said wheel mounting and steering member at each side of the steering axis adapted for one end of a tie rod, and means for mounting on said reversible wheel mounting member either of the two bearing members to secure the tie rod for pivotal movement on either of the tie rod bearings in an axis positioned within the wheel.

8. In a truck of the class described, a wheel mounting and steering member having at one side thereof a stub shaft upon which a wheel rotates in a particular axis relatively to said member, upper and lower flanges formed integrally on the opposed side of said member and adapted to receive therebetween an end of an axle in a position below the axis in which the wheel rotates, bearing means on said upper and lower flanges for a king pin to pivot the mounting and steering member on the end of the axle, a further flange on said mounting and steering member at one side of the said bearing means, a bearing member on said mounting and steering member for coacting with said further flange to pivot a tie rod in an axis outwardly beyond the bearing means relatively to the length of the axle, and said bearing member spaced above the said upper flange on the wheel mounting and steering member to enable the tie rod to move between the upper flange and the bearing member when the wheel is steered at a sharp angle.

9. In a truck of the class described, a wheel mounting and steering member having at one side thereof a stub shaft upon which a wheel rotates, bearing means for a king pin on the opposed side of the mounting and steering member to pivot the member for movement in a steering axis relatively to an end of an axle, a further bearing on said mounting and steering member at one side of the steering axis, a bearing member on said mounting and steering member for coacting with said further bearing to pivot a tie rod in an axis outwardly beyond the steering axis relatively to the length of the axle, and said bearing member spaced above the bearing means for the king pin to enable the tie rod to move between said bearing means and the bearing member when the wheel is steered through a wide angle.

10. In a truck of the class described, a wheel mounting and steering member having at one side thereof a stub shaft, a wheel rotating on said stub shaft, means on the opposed side of said mounting and steering member for mounting the member to rotate in a steering axis positioned within the wheel, a bearing on said mounting and steering member at one side of the steering axis, a bearing member on said mounting and steering member for coacting with said bearing to pivot a tie rod in an axis farther within the wheel than the steering axis, and said bearing member spaced above the means for mounting the wheel mounting and steering member on the steering axis whereby to enable the tie rod to move between said means and the bearing member when the wheel is steered through a wide angle.

11. In a truck of the class described, a wheel mounting and steering member having at one side thereof a shaft upon which a wheel rotates, bearing means on the opposed side of said wheel mounting and steering member for mounting the member to rotate in a steering axis relatively to one end of an axle, a pivot for one end of a tie rod, a bearing for said pivot on the wheel mounting and steering member at one side of the steering axis and outwardly beyond the steering axis relatively to the length of the axle, a bearing member coacting with said bearing to mount said pivot on the wheel mounting and steering member, and said pivot being so related vertically to the bearing means for the wheel mounting and steering member as to enable the tie rod on the pivot to move past said bearing means as the wheel mounting and steering member rotates in its steering axis.

12. In a truck of the class described, a pair of reversible wheel mounting and steering members each having integrally formed upon one side thereof bearing means defining a vertical steering axis in which the member may be mounted to rotate on a king pin, a tie rod, a steering arm for one of said wheel mounting members, second bearing means on said steering arm and said bearing member for opposed ends of said tie rod, bearings on each of said wheel mounting and steering members adjacent said bearing means, and duplicate means on each of said wheel mounting members selectively mounting the steering arm on one of said reversible wheel mounting members and the bearing member on the other of said wheel mounting members with each of said second bearing means in position relatively to said bearings on said wheel mounting members to cooperate with said bearings and pivotally support said tie rod relatively to both wheel mounting members.

13. In a truck of the class described, a pair of wheel mounting and steering members each having a stub shaft upon which a wheel rotates relatively to the member in a particular axis, an axle, a king pin whereby each wheel mounting and steering member is mounted relatively to an end of said axle for movement in a steering axis, a truck frame member, pivot means mounting said axle to rock on said truck frame member in an axis positioned below the axis of rotation of each wheel, a tie rod pivot on each wheel mounting and steering member above the end of the axle and in offset relation to the king pin, and a tie rod offset at its ends and supported at its ends on said rod pivots with its central part disposed over the axle for movement over the axle while holding said wheel mounting members in steering alignment as the wheels are steered.

14. In a truck of the class described, a pair of wheel mounting and steering members each having a stub shaft upon which a wheel rotates relatively to the member in a particular axis, an axle, a king pin whereby each wheel mounting and steering member is mounted relatively to an end of said axle for movement in a steering axis, a truck frame member, pivot means mounting said axle to rock on said truck frame member in an axis positioned below the axis of rotation of each wheel, a tie rod pivot on each wheel mounting and steering member positioned within the adjacent wheel above the end of the axle and in offset relation to the king pin, and a tie rod offset at its ends and supported at its ends on said rod pivots with its central part disposed over the axle for movement over the axle while holding said wheel mounting members in steering alignment as the wheels are steered.

References Cited in the file of this patent
UNITED STATES PATENTS

| | | |
|---|---|---|
| 1,059,149 | Grotnes | Apr. 15, 1913 |
| 1,136,503 | Baucom | Apr. 20, 1915 |
| 1,826,113 | Winsor | Oct. 6, 1931 |
| 1,837,516 | Baits | Dec. 22, 1931 |
| 1,924,586 | Zerk | Aug. 29, 1933 |
| 2,110,425 | Schroeder | Mar. 8, 1938 |
| 2,242,453 | Cochran | May 20, 1941 |
| 2,274,353 | Ash | Feb. 24, 1942 |
| 2,428,469 | Plant et al. | Oct. 7, 1947 |